United States Patent
Prasad et al.

(10) Patent No.: US 11,225,153 B2
(45) Date of Patent: Jan. 18, 2022

(54) INTELLIGENT VEHICLES WITH ADVANCED VEHICLE CAMERA SYSTEMS FOR UNDERBODY HAZARD AND FOREIGN OBJECT DETECTION

(71) Applicant: GM GLOBAL TECHNOLOGY OPERATIONS LLC, Detroit, MI (US)

(72) Inventors: Rashmi Prasad, Troy, MI (US); Chandra S. Namuduri, Troy, MI (US); Sai Vishnu Aluru, Commerce Township, MI (US); Christopher A. Stanek, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/780,298

(22) Filed: Feb. 3, 2020

(65) Prior Publication Data

US 2021/0237594 A1 Aug. 5, 2021

(51) Int. Cl.
*H04N 5/247* (2006.01)
*G07C 5/08* (2006.01)
(Continued)

(52) U.S. Cl.
CPC ............ *B60L 53/124* (2019.02); *B60L 50/66* (2019.02); *B60L 53/126* (2019.02); *B60L 53/36* (2019.02); *G07C 5/08* (2013.01); *G07C 5/0825* (2013.01); *G07C 5/0891* (2013.01); *G05D 1/0246* (2013.01); *G06K 9/00791* (2013.01)

(58) Field of Classification Search
CPC ...... B60L 53/124; B60L 53/126; B60L 50/66; B60L 53/36; G06K 9/00791; G05D 1/0246; G01S 17/931; G01S 2013/932; G01S 2013/9318; G01S 2013/9319; G01S 2013/93185; G07C 5/0891; G07C 5/08; G07C 5/0825; H04N 7/181; H04N 5/247; B60W 10/04; B60W 10/18; B60W 10/20;
(Continued)

(56) References Cited

U.S. PATENT DOCUMENTS

| 6,906,639 B2 * | 6/2005 | Lemelson | ............ | G07C 5/0891 340/903 |
| 9,236,758 B2 | 1/2016 | Fisher | | |

(Continued)

*Primary Examiner* — Nga X Nguyen
(74) *Attorney, Agent, or Firm* — Quinn IP Law

(57) ABSTRACT

A method for operating an advanced driver assistance (ADAS) system of a motor vehicle includes a vehicle controller receiving, from side and end cameras mounted to the vehicle, camera signals indicative of real-time images of outboard-facing side and end views of the vehicle. The controller determines a region of interest (ROI) inset within each end/side view within which is expected foreign objects and/or hazards. These ROIs are analyzed to detect if a foreign object/hazard is present in the vehicle's end and/or side views. Responsive to detecting the foreign object/hazard, movement of the foreign object/hazard is tracked to determine if the foreign object/hazard moves towards or away from the vehicle's underbody region. If the foreign object/hazard moves to the underbody region, control signals are transmitted to the vehicle's propulsion and/or steering system to automate preventative action that prevents collision of the vehicle with and/or removes the foreign object/hazard from the underbody.

19 Claims, 5 Drawing Sheets

(51) Int. Cl.
*B60L 53/124* (2019.01)
*B60W 30/09* (2012.01)
*B60W 10/20* (2006.01)
*B60W 10/18* (2012.01)
*B60W 40/02* (2006.01)
*B60W 10/04* (2006.01)
*G08G 1/16* (2006.01)
*H04N 7/18* (2006.01)
*H02J 50/60* (2016.01)
*B60L 53/126* (2019.01)
*B60L 53/36* (2019.01)
*B60L 50/60* (2019.01)
*G05D 1/02* (2020.01)
*G06K 9/00* (2006.01)

(58) Field of Classification Search
CPC ...... B60W 30/09; B60W 30/08; B60W 50/14; B60W 40/02; G08G 1/16; H02J 50/60
See application file for complete search history.

(56) References Cited

U.S. PATENT DOCUMENTS

| | | | |
|---|---|---|---|
| 10,018,744 | B2 | 7/2018 | Roy et al. |
| 10,245,966 | B2 | 4/2019 | Jones et al. |
| 10,457,158 | B2 | 10/2019 | Namou et al. |
| 2008/0265835 | A1 | 10/2008 | Reed et al. |
| 2010/0198754 | A1 | 8/2010 | Jones et al. |
| 2010/0253493 | A1* | 10/2010 | Szczerba ............... G01S 13/723 340/435 |
| 2012/0181953 | A1 | 7/2012 | Hsu et al. |
| 2013/0027048 | A1 | 1/2013 | Schwarz et al. |
| 2013/0038279 | A1 | 2/2013 | Seyerle et al. |
| 2014/0197776 | A1 | 7/2014 | Schlaupitz et al. |
| 2016/0052450 | A1 | 2/2016 | Chan et al. |
| 2016/0285296 | A1 | 9/2016 | Namou et al. |
| 2018/0356505 | A1* | 12/2018 | Miyata ................. G01S 13/931 |
| 2019/0035279 | A1* | 1/2019 | Tang .................... G08G 1/0965 |
| 2021/0086644 | A1* | 3/2021 | Stockinger ............. B60L 50/60 |

* cited by examiner

INTELLIGENT VEHICLES WITH ADVANCED VEHICLE CAMERA SYSTEMS FOR UNDERBODY HAZARD AND FOREIGN OBJECT DETECTION

INTRODUCTION

The present disclosure relates generally to automated control systems of motor vehicles. More specifically, aspects of this disclosure relate to electric-drive vehicles with control logic for automating underbody hazard detection and foreign object protection.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric ("electric-drive") vehicles, on the other hand, utilize alternative power sources to propel the vehicle and, thus, minimize or eliminate reliance on a fossil-fuel based engine for tractive power.

A full electric vehicle (FEV)—colloquially branded as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery back, and battery cooling and charging hardware in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, hybrid electric vehicle engines may be turned off, in whole or in part, while the vehicle is propelled by the electric motor(s).

High-voltage electrical systems govern the transfer of electricity between the traction motor(s) and a rechargeable traction battery pack (also referred to as "electric-vehicle battery") that stores and supplies the requisite power for operating an electric-drive powertrain. A traction battery pack contains multiple stacks of battery cells that are packaged into individual battery modules and stored inside a battery pack housing. Some vehicular battery systems employ multiple independently operable, high-voltage battery packs to provide higher voltage delivery and greater system capacity through increased amp-hours. The vehicle's electric system may employ a front-end DC-to-DC power converter that is electrically connected to the vehicle's traction battery pack(s) in order to increase the voltage supply to a high-voltage main direct current (DC) bus and an electronic power inverter module (PIM). Operation and control of a multi-phase electric motor, such as permanent magnet synchronous traction motors, may be accomplished by employing the PIM to transform DC electric power to alternating current (AC) power using pulse-width modulated control signals output from a Battery Pack Control Module (BPCM).

As hybrid and electric vehicles become more prevalent, infrastructure is being developed and deployed to make day-to-day use of such vehicles feasible and convenient. Electric vehicle supply equipment (EVSE) for recharging electric-drive vehicles come in many forms, including residential electric vehicle charging stations (EVCS) purchased and operated by a vehicle owner (e.g., installed in the owner's garage), publicly accessible EVCS provisioned by public utilities or private retailers (e.g., at gas stations or municipal charging facilities), and sophisticated high-voltage, high-current charging stations used by automobile manufacturers, dealers, and service stations. Plug-in hybrid and electric vehicles originally equipped with an onboard traction battery pack, for example, can be recharged by physically connecting a charging cable of the EVCS to a complementary charging port of the vehicle. By comparison, wireless electric vehicle charging systems (WEVCS) utilize electromagnetic field (EMF) induction or other suitable wireless power transfer (WPT) techniques to provide vehicle charging capabilities without the need for charging cables and cable ports. It is axiomatic that large-scale vehicle electrification in turn necessitates a concomitant buildout of readily accessible charging infrastructure to support daily vehicle use in both urban and rural scenarios, for both short-distance and long-distance vehicle range.

SUMMARY

Presented herein are intelligent vehicle systems with attendant control logic and networked on-body vehicle cameras for underbody hazard and object detection, methods for making and methods for using such systems, and electric-drive vehicles equipped with such systems to optimize autonomous driving and/or wireless vehicle charging. By way of example, there are presented advanced park assist (APA) systems with vehicle-mounted, high-definition (HD) cameras that operate independently or, if desired, in conjunction with other vehicle sensors and/or infrastructure-based cameras to acquire real-time perspective view data of the vehicle's underbody and driving surface. This enables underbody hazard and (living or non-living) foreign object detection to alert the driver and automate preventative measures to protect the vehicle and object. An in-vehicle Global Positioning System (GPS) transceiver may retrieve GPS coordinate data of real-time locations for the vehicle and a target element, such as an EMF wireless charging pad. In addition, a resident short-range communications component may wirelessly connect with a WEVCS to ascertain charge station availability and compatibility, adopt charging and communication protocols, and select service, alignment, and pairing settings. A dedicated or shared vehicle controller derives path plan data for maneuvering the vehicle to, and concomitantly aligning predetermined vehicle segments with, target marker(s) of the target element. Using the foregoing information, the vehicle controller or a distributed network of control modules or subsystem controllers govern vehicle speed, heading, and travel distance via the vehicle's propulsion, steering, and brake systems in a closed-loop control scheme to enable living object protection (LOP) and underbody hazard detection and avoidance.

Attendant benefits for at least some of the disclosed concepts include novel vehicle system architectures that enable accurate and efficient underbody hazard and foreign object detection. Advanced vision-based APA systems are able to monitor for, identify, and ascertain precise location, shape, and size data of underbody foreign objects and hazards, and automate ameliorative measures to protect the vehicle and object. For wireless charging applications, disclosed features help to optimize charging efficiency while maintaining high levels of overall system robustness. Disclosed advanced driver assistance systems eliminate the need for dedicated sensors, video processing modules, and hardware accelerators for accurate underbody detection and protection during automated driving operations.

Aspects of this disclosure are directed to advanced driver assistance systems (ADAS) with attendant control logic for camera-based underbody hazard and foreign object detection, e.g., for intelligent park assist and optimized wireless vehicle charging. In an example, there is presented a vehicle ADAS system that includes one or more (front/rear) end cameras that each mounts proximate a respective end of the vehicle body, one or more (left/right) side cameras that each mounts proximate a respective lateral side of the vehicle body, and an optional underbody camera that mounts proximate the vehicle body's undercarriage. Each end camera is operable to capture real-time, outboard-facing forward or rearward end views of the vehicle, while each side camera is operable to capture real-time, outboard-facing leftward or rightward side views of the vehicle, and the underbody camera is operable to capture real-time, outboard-facing downward views.

The APA system employs a resident or remote vehicle controller that is communicatively connected to the cameras to receive therefrom camera-generated signals indicative of real-time images of the vehicle's end, side, and (optionally) undercarriage views. The controller determines a respective region of interest (ROI) that is inset within each of the outboard-facing vehicle views within which foreign objects and/or hazards are expected. These ROIs are analyzed to detect whether or not a foreign object and/or hazard is present in the vehicle's outboard-facing end and/or side views. Responsive to detecting the foreign object/hazard, the controller tracks movement of the foreign object/hazard relative to the vehicle to determine if the foreign object/hazard moves towards or away from an underbody region of the vehicle. Responsive to the foreign object/hazard being detected in or otherwise moving into the vehicle's underbody region, an alert is transmitted to the driver and/or control signals are transmitted to the vehicle's propulsion, steering and/or braking systems to take preventative action calibrated to prevent collision of the vehicle with and/or remove the foreign object/hazard from the underbody region.

Additional aspects of this disclosure are directed to vehicles equipped with intelligent vehicle systems that provision camera-based underbody hazard and foreign object detection. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. For purposes of this disclosure, the terms "automated" and "autonomous" may be used synonymously and interchangeably to denote vehicles with assisted and/or fully autonomous driving capabilities, including vehicle platforms that may be classified as a Society of Automotive Engineers (SAE) Level 2, 3, 4 or 5 vehicle.

In an example, an electric-drive motor vehicle includes a vehicle body with multiple road wheels and other standard original equipment. A vehicle propulsion and powertrain system (e.g., engine and/or motor, transmission, final drive, powertrain control module (PCM), etc.), a vehicle brake system (e.g., disk/drum brakes, hydraulics, brake system control module (BSCM), etc.), a steering system (e.g., drive-by-wire framework) and a network of sensing devices (e.g., radar, LIDAR, infrared, camera, GPS, automated system control module (ASCM), etc.), are also mounted to the vehicle body. For electric-drive vehicle applications, one or more electric traction motors operate alone (e.g., for FEV powertrains) or in conjunction with an internal combustion engine assembly (e.g., for HEV powertrains) to selectively drive one or more of the road wheels to thereby propel the vehicle. Also mounted on the vehicle body is one or more rechargeable traction battery packs that selectively store and transmit electric current to power the traction motor(s). A wireless charging component, which is also mounted to the vehicle body and electrically connected to the battery pack, operably couples with a wireless charging pad of a wireless electric vehicle supply equipment (WEVSE) system to thereby generate electric current.

Continuing with the discussion of the above example, the vehicle also includes front and rear cameras mounted proximate front and rear ends of the vehicle body, respectively, left and right side cameras mounted proximate left and right lateral sides of the vehicle body, respectively, and a vehicle controller operatively connected to the distributed network of cameras and the wireless charging component. The vehicle controller is programmed to receive, from the on-body vehicle cameras, camera signals indicative of real-time images of the vehicle's outboard-facing forward, rearward, leftward and rightward views, and determine a respective region of interest inset within each view within which foreign objects/hazards are expected. Each ROI is analyzed to determine if a foreign object/hazard is present in one of the vehicle views; responsive to detecting a foreign object/hazard, the controller tracks movement of the foreign object/hazard to determine if the foreign object/hazard moves towards or away from an underbody region of the vehicle. If the foreign object/hazard moves to the underbody region, the controller transmits an alert to the driver and control signals to the vehicle's propulsion and/or steering system to take preventative action calibrated to prevent collision of the vehicle with and/or remove the foreign object/hazard from the underbody region.

Also presented herein are methods for manufacturing and methods for operating any of the disclosed electric-drive vehicles and/or ADAS system architectures. In an example, a method is presented for operating an ADAS system of a motor vehicle. This representative method includes, in any order and in any combination with any of the above and below disclosed options and features: receiving, via a vehicle controller of the ADAS system from an end camera mounted proximate a front or rear end of a vehicle body of the vehicle, camera signals indicative of real-time images of an outboard-facing forward or rearward end view of the vehicle; receiving, via the vehicle controller from a side camera mounted proximate a left or right lateral side the vehicle body, camera signals indicative of real-time images of an outboard-facing leftward or rightward side view of the vehicle; determining a respective region of interest (ROI) inset within each of the outboard-facing end and side views within which is expected a foreign object and/or a hazard; analyzing the ROIs to detect if the foreign object and/or hazard is present in the outboard-facing end view and/or outboard-facing side view of the vehicle; responsive to detecting the foreign object and/or hazard, tracking movement of the foreign object and/or hazard to determine if the foreign object and/or hazard moves towards or away from an underbody region of the vehicle; and transmitting an alert to the driver and/or control signals to the propulsion and/or steering system to take preventative action calibrated to prevent collision of the vehicle with and/or remove from the underbody region the foreign object and/or hazard.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

Figure 1:
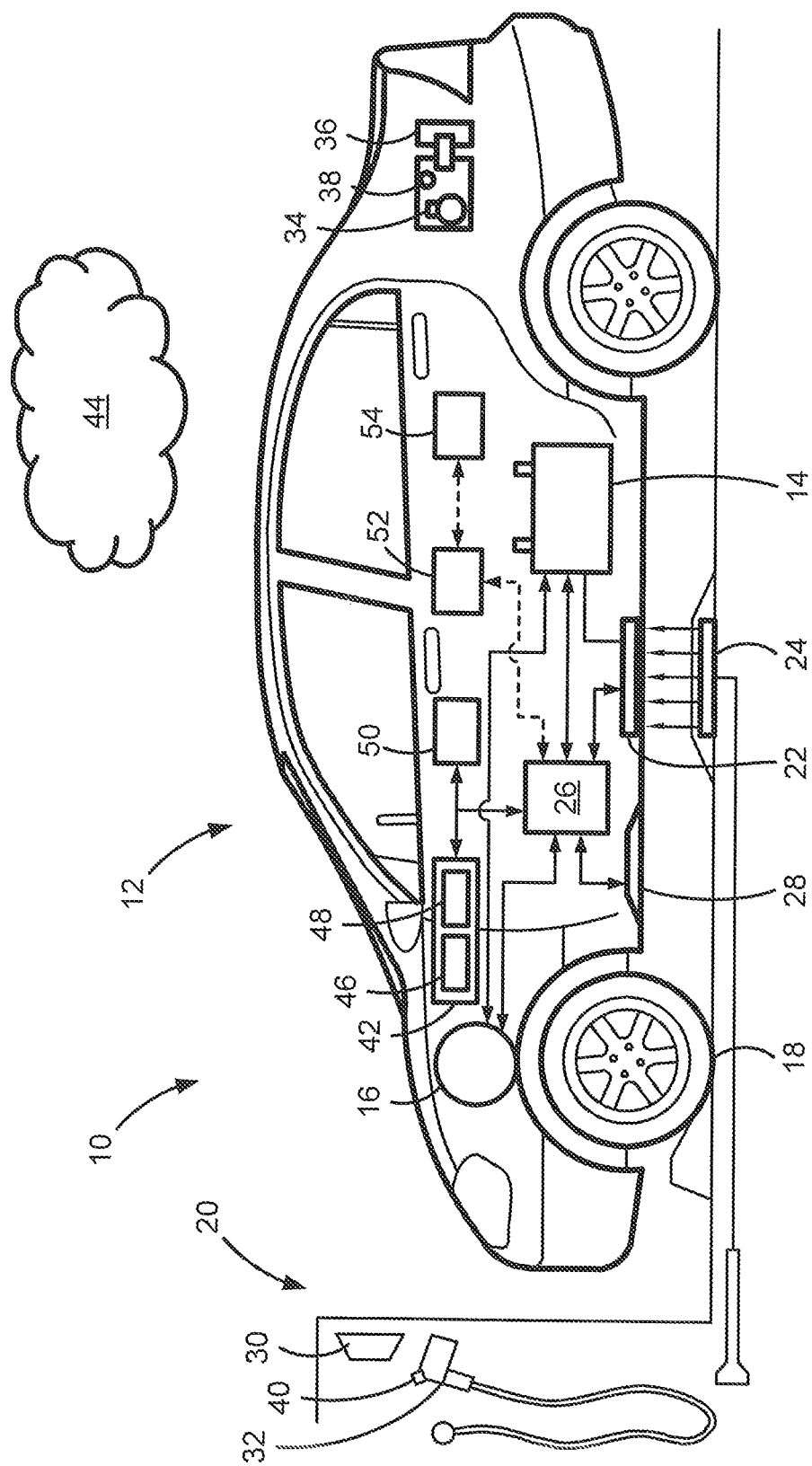
FIG. 1 is a partially schematic, side-view illustration of a representative motor vehicle equipped with both wired and wireless charging capabilities and operably coupled to a representative electric vehicle charging station in accordance with aspects of the present disclosure.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the present disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a sedan-style, electric-drive (hybrid or electric) motor vehicle. Packaged within a vehicle body 12 of the automobile 10, e.g., within a passenger compartment, trunk compartment, or dedicated battery compartment, is a traction battery pack 14 that is electrically coupled to and powers one or more electric traction motors 16. The motor(s) 16, in turn, operate to turn one or more of the vehicle's road wheels 18 and thereby propel the vehicle 10. The illustrated automobile 10—also referred to herein as "motor vehicle" or "vehicle" for short—is merely an exemplary application with which novel aspects of this disclosure may be practiced. In the same vein, implementation of the present concepts for the specific electric vehicle supply equipment (EVSE) illustrated in FIG. 1 should also be appreciated as an exemplary application of the disclosed concepts. As such, it will be understood that aspects and features of this disclosure may be applied to alternative types of EVSE, implemented for any logically relevant type of vehicle and vehicle powertrain, and utilized for other advanced driver assistance system (ADAS) operations. Moreover, only selected components of the vehicle, EVSE and ADAS systems have been shown and will be described in additional detail herein. Nevertheless, the systems, methods and devices discussed below can include numerous additional and alternative features, and other commercially available peripheral components, for example, to carry out the various protocols and algorithms of this disclosure.

FIG. 1 is a simplified illustration of the electric-drive vehicle 10 docked at and operably coupled to a vehicle charging station 20 for recharging an onboard rechargeable energy source, such as a high-voltage direct current (DC) traction battery pack 14. Traction battery pack 14 may take on many suitable configurations, including an array of lead-acid, lithium-ion, or other applicable type of rechargeable electric vehicle batteries (EVB). To provide an operable coupling between the traction battery pack 14 and vehicle charging station 20, the vehicle 10 may include an inductive charging component 22, e.g., with an integrated induction coil, that is mounted to the underside of the vehicle body 12. This inductive charging component 22 functions as a wireless charging interface that is compatible with a wireless charging pad or platform 24, e.g., with an internal EMF coil, of the vehicle charging station 20. In the illustrated example, the wireless charging pad/platform 24 is located on the floor of the vehicle charging station 20, and is positioned in accordance with a "target position" that may serve as a desired parking location for purposes of efficient and effective wireless charging of the vehicle 10. In particular, FIG. 1 depicts the vehicle 10 parked in a location that helps to ensure the inductive charging component 22 is substantially or completely aligned in both lateral and longitudinal dimensions with the wireless charging pad 24. Put another way, the vehicle 10 in FIG. 1 is considered to be in proper fore-aft alignment and in proper starboard-port alignment with a designated target position to complete an inductive charging event for the vehicle 10 while maximizing the percentage of power transmitted wirelessly between the two devices.

The vehicle charging station 20 may employ any heretofore and hereafter developed type of wired and wireless charging technology, including inductive charging, radio charging, capacitive charging, and resonance charging, as some non-limiting examples. In accordance with electromagnetic induction charging technology, the representative wireless charging pad 24 of FIG. 1 may be activated with electric current to generate an alternating electromagnetic field proximate the inductive charging component 22. This magnetic field, in turn, induces an electric current in the inductive charging component 22 of the vehicle 10. The induced current may be filtered, stepped-down, and/or phase-shifted by in-vehicle electrical modulation circuitry (e.g. a traction power inverter module (TPIM)) to charge the traction battery pack 14 or any other energy source of the vehicle 10 (e.g., a standard 12V lead-acid starting, lighting, and ignition (SLI) battery, an auxiliary power module, etc.). As mentioned previously, optimal wireless charging performance may be obtained when the inductive charging component 22 is properly oriented in both fore-aft (longitudinal) and port-starboard (lateral) alignment with the wireless charging pad 24 in accordance with a vehicle-calibrated accuracy threshold.

Traction battery pack 14 stores energy that can be used for propulsion by the electric machine(s) 16 and for operating other vehicle electrical systems. The traction battery pack 14 is communicatively connected (wired or wirelessly) to one or more vehicle controllers, represented in FIG. 1 by electronic control unit (ECU) 26, that regulates the operation of various onboard vehicle systems and components. Contactors controlled by the ECU 26, for example, may isolate the traction battery pack 14 from other components when opened, and connect the traction battery pack 14 to other components when closed. The ECU 26 is also communicatively connected to the electric traction motor(s) 16 to control, for example, bi-directional transfer of energy between the traction battery pack 14 and each motor 16. For instance, traction battery pack 14 may provide a DC voltage while the motor(s) 16 may operate using a three-phase AC current; in such an instance, ECU 26 converts the DC voltage to a three-phase AC current for use by the motor-generator(s) 16. In a regenerative mode where the traction motor(s) 16 act as electric generators, the ECU 26 may convert three-phase AC current from the motor-generator(s) 16 to DC voltage compatible with the traction battery pack 14. The representative ECU 26 is also shown communicating with charging component 22, for example, to condition the power supplied from the vehicle charging station 20 to the battery pack 14 to help ensure proper voltage and current levels. The ECU 26 may also interface with the charging station 20, for example, to coordinate the delivery of power to the vehicle 10.

Vehicle charging station 20 of FIG. 1 also offers wired charging for electric vehicle 10 via a "plug-in" electrical connector 32, which may be one of a number of different commercially available electrical connector types. By way of non-limiting example, electrical connector 32 may be a Society of Automotive Engineers (SAE) J1772 (Type 1) or J1772-2009 (Type 2) electrical connector with single-phase or split-phase modes operating at 120 to 240 volts (V) with alternating current (AC) at up to 80 amperes (A) peak current for conductive vehicle charging. Furthermore, the charging connector 32 may also be designed to meet the standards set forth in International Electrotechnical Commission (IEC) 62196-2 and/or 62196-3 Fdis, as well as any other presently available or hereafter developed standards. A charge port 34 accessible on the exterior of vehicle body 12 is a wired charging interface functioning as an electrical inlet into which electrical connector 32 may be plugged or otherwise mated. This port 34 enables a user to easily connect and disconnect electric vehicle 10 to/from a readily available AC or DC source, such as a public utility power grid via charging station 20. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the vehicle 10 and station 20 may individually or collaboratively monitor wired/wireless charging availability, wireless power quality, and other related issues that may affect vehicle charging. According to the illustrated example, the vehicle ECU 26 of FIG. 1 communicates with and receives sensor signals from a monitoring system, which may comprise one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with an assortment of sensors packaged at similar or alternative locations to that shown in the drawings. A CPD sensor 38 mounted by the charge port 34 may sense, and be polled or read by the vehicle's ECU 26 to determine, a door status—opened or closed—of the CPD 36. As another option, a latching button 40 that helps to physically attach and secure the electrical connector 32 to the charge port 34 may include an internal switch (e.g., an SAE S3 type switch) that functions as a sensing device to detect whether or not the electrical connector 32 is operatively connected to the charge port 34. There are numerous other types of sensing devices that may also be used, including thermal sensing devices, such as passive thermal infrared sensors, optical sensing devices, such as light and laser-based sensors, acoustic sensing devices, such as surface acoustic wave (SAW) and ultrasonic sensors, capacitive sensing devices, such as capacitive-based proximity sensors, etc.

The representative vehicle 10 of FIG. 1 may be originally equipped with a vehicle telecommunication and information ("telematics") unit 42 that wirelessly communicates (e.g., via cell towers, base stations, mobile switching centers (MSCs), etc.) with a remotely located or "off-board" cloud computing system 44. Acting as both a user-input device and a vehicle-output device, telematics unit 42 may be equipped with an electronic video display device 46 and assorted input controls 48 (e.g., buttons, knobs, switches, trackpads, keyboards, touchscreens, etc.). These telematics hardware components may function, at least in part, as a resident vehicle navigation system, e.g., to enable assisted and/or automated vehicle navigation. The telematics unit may also operate as a human-machine interface (HMI), e.g., to enable a user to communicate with the telematics unit 42 and other systems and system components of the vehicle 10. Optional peripheral hardware may include a microphone that provides a vehicle occupant with means to input verbal or other auditory commands; the vehicle 10 may be equipped with an embedded voice-processing unit programmed with a computational speech recognition software module. A vehicle audio system with one or more speaker components may provide audible output to vehicle occupants and may be either a stand-alone device dedicated for use with the telematics unit 42 or may be part of a general audio system.

With continuing reference to FIG. 1, telematics unit 42 is an onboard computing device that provides a mixture of services, both individually and through its communication with other networked devices. Telematics unit 42 may be generally composed of one or more processors, each of which may be embodied as a discrete microprocessor, an application specific integrated circuit (ASIC), a dedicated control module, etc. Vehicle 10 may offer centralized vehicle control via ECU 26 that is operatively coupled to one or more electronic memory devices 50, each of which may take on the form of a CD-ROM, magnetic disk, IC device, semiconductor memory (e.g., various types of RAM or ROM), etc., with a real-time clock (RTC). Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 52. Close-range wireless connectivity may be provided via a short-range wireless communications device (e.g., a BLUETOOTH® unit or near field communications (NFC) transceiver), a dedicated short-range communications (DSRC) component, and/or a dual antenna, all of which are collectively represented at 54. The various communications devices described above may be configured to exchange data as part of a periodic broadcast in a Vehicle-to-Vehicle (V2V) communications system or a vehicle-to-everything (V2X) communications system, e.g., Vehicle-to-Infrastructure (V2I), Vehicle-to-Pedestrian (V2P), Vehicle-to-Device (V2D), etc.

Operation of the automobile 10 of FIG. 1 may necessitate accurate and reliable vehicle alignment with a designated position, namely precise orientation and location of a specific section of the vehicle 10, a designated component of the vehicle 10, and/or of the vehicle 10 in its entirety with a target location, orientation, object, landmark, etc. (collectively "target element" or "target"). If the target element with which the vehicle 10 is to be aligned is obstructed from the driver's view during any part of this driving operation, the requisite vehicle alignment may not be achievable. To mitigate human-borne error from such operations, disclosed intelligent vehicle systems and control logic automate precise lateral and longitudinal vehicle positioning utilizing a high-definition (HD) vision system. An HD vision system may be typified as a video camera system with a minimum of at least about a 1.0 to 2.5-megapixel (MP) full-frame resolution or, for at least some implementations, about 50-65 MP with a 4K video resolution at about 10 to 60 frames per second (fps) or greater. The HD vision system may provide a minimum horizontal field of view of at least about 160° to 210° and a minimum vertical field of view of at least about 100° to 150° with respect to a forward driving direction of the vehicle 10.

Feedback signals are analyzed to derive a coordinate distance (Cartesian in x, y, z; Celestial in $\varphi$, $\Theta$; GPS in DMS, DMM or DD) from a select point, edge, and/or section of the vehicle to a target center or other target marker of the target element. It may be desirable that the accuracy of this distance measurement be better than about 3.0 to about 8.0 millimeters (mm) at a distance of less than 1 meter (m) between the target and vehicle. Using camera-acquired data, the system is able to detect and define a target element at approximately 5.0 m or less from the camera system. Intrinsic and extrinsic camera parameters (e.g., yaw, pitch, roll, x-y-z location coordinates, etc.) may be used to identify the target, e.g., at vehicle speeds of less than approximately three (3) miles per hour (mph). Disclosed vehicle alignment systems and methods may be characterized by a lack of use of a dedicated hardware accelerator, video processing module (VPM), sensors, cameras, and/or motion sensor odometry to provision automated vehicle system operation.

Figure 2:
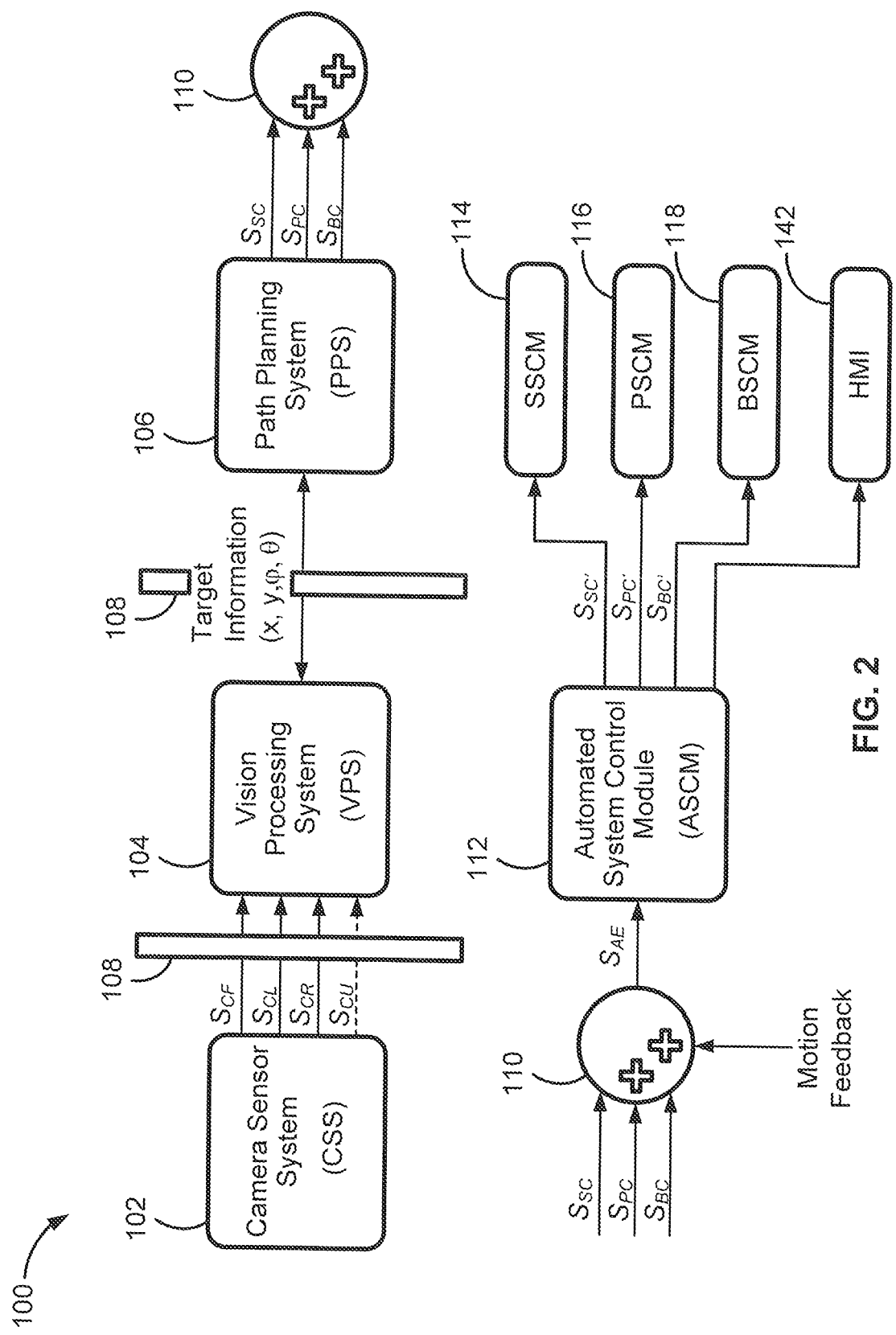
FIG. 2 is a schematic illustration of a representative advanced driver assistance system (ADAS) architecture for provisioning vision-based underbody hazard and foreign object detection and protection in accordance with aspects of the present disclosure.

Illustrated in FIG. 2 is an embedded intelligent vehicle control system 100—described hereinbelow as an advanced park assist (APA) system—for enabling controller-automated underbody hazard and foreign object detection as part of select vehicle operations, such as vehicle driving, parking, idling, charging, etc., of a motor vehicle. Intelligent vehicle system 100 is generally typified by a vision-based Camera Sensor System (CSS) 102 for capturing real-time image data of the vehicle's surroundings and driving surface, a Vision Processing System (VPS) 104 for analyzing, smoothing, fusing, and/or synthesizing camera-generated sensor signals, and a Path Planning System (PPS) 106 with optional Hazard Level Detection (HLD) for calculating vehicle route data from the processed sensor signals. The CSS 102, VPS 104, and PPS 106 interface with an Automated System Control Module (ASCM) 112 to automate select vehicle driving operations, e.g., as port of a wireless charging control scheme, and with a vehicle HMI 142 in order to transmit vehicle information to and, optionally, receive inputs from a vehicle occupant.

Figure 3:
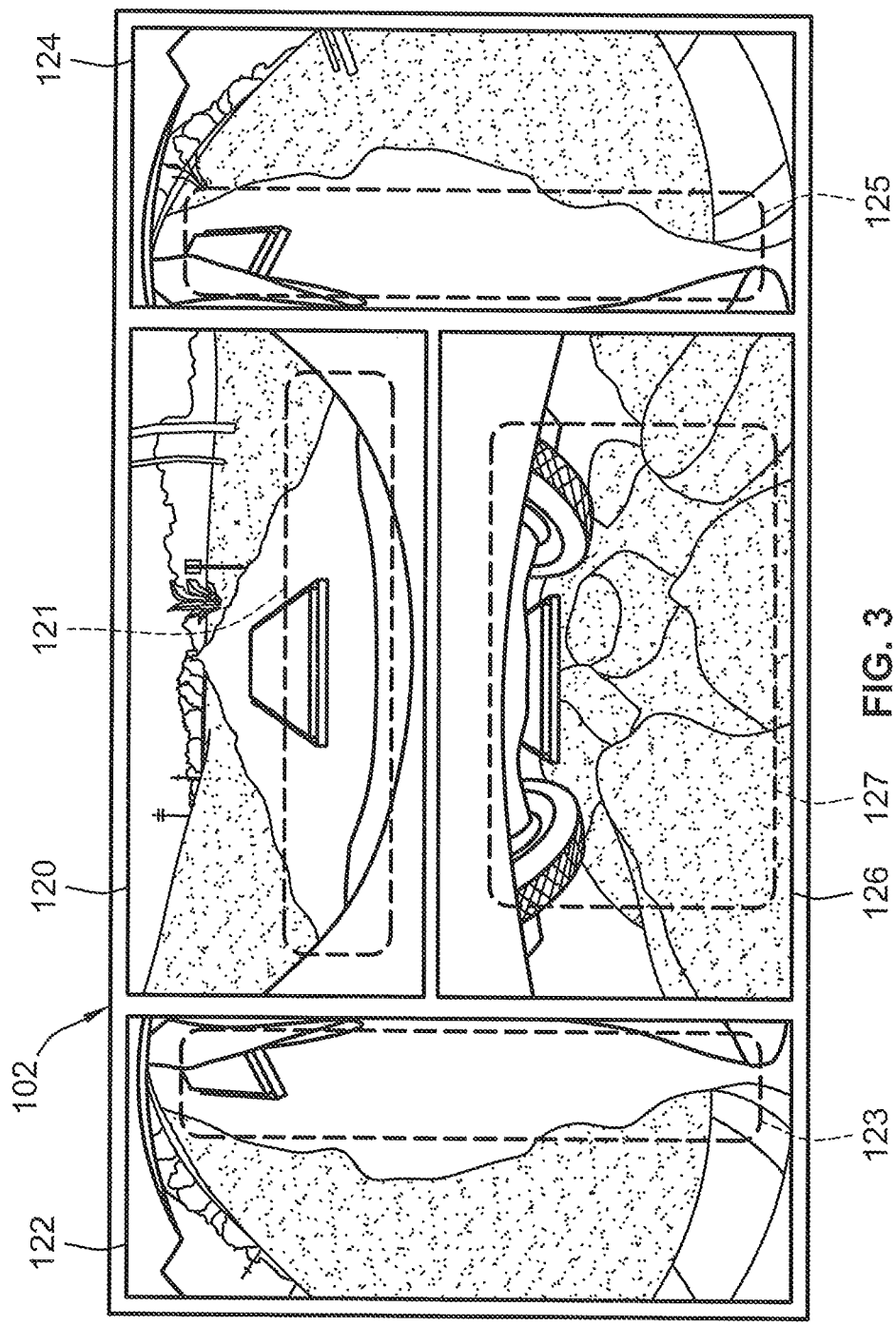
FIG. 3 presents forward-facing, side-facing, and downward-facing perspective views of a motor vehicle captured by high-definition, on-body front, left-side, right-side and underbody cameras in accordance with aspects of the present disclosure.

Camera Sensor System 102 may be composed of any number, type, and arrangement of image capture devices, such as a distributed array of digital video cameras each fabricated with a complementary metal-oxide-semiconductor (CMOS) sensor, charge-coupled device (CCD) sensor, or other suitable active-pixel sensor (APS). By way of non-limiting example, the CCS 102 is portrayed in FIG. 3 with: (1) a first (front) longitudinal camera 120 that mounts to the vehicle body proximate a front end thereof (e.g., inside the engine bay behind the front grille); (2) a first (left-hand) side camera 122 that mounts proximate a first lateral (port) side of the vehicle body (e.g., integrated into a driver-side rearview mirror assembly); (3) a second (right-hand) side camera 124 that mounts proximate a second lateral (starboard) side of the vehicle body (e.g., integrated into a passenger-side rearview mirror assembly); and an optional second (underbody) longitudinal camera 126 that mounts proximate the vehicle body's undercarriage (e.g., mounted to a chassis side-rail or cross-member). CCS 102 may include additional on-body vehicle camera sensors, such as a third (rear) longitudinal camera that mounts to the vehicle body proximate a rear end thereof (e.g., inside a rear bumper facia or liftgate assembly). The type, placement, number, and interoperability of the distributed array of in-vehicle camera sensors may be adapted, singly or collectively, to a given vehicle platform for achieving a desired level of autonomous vehicle operation and underbody hazard and foreign object detection accuracy.

The distributed array of camera sensors 120, 122, 124 and 126 (FIG. 3) in CSS 102 communicates respective sensor signals—front, left, right, and underbody camera signals $S_{CF}$, $S_{CL}$, $S_{CR}$, and $S_{CU}$, respectively—via a controller area network (CAN) bus 108 (FIG. 2) with the VPS 104. Upon receipt, VPS 104 may comprise any requisite classification, filtering, preprocessing, fusion, and analysis hardware and software for processing received raw sensor data. VPS 104 concomitantly analyzes the processed data to determine target presence, type, and location data (x, y, $\phi$, $\Theta$), which is then communicated to PPS 106 via CAN bus 108. As will be explained in addition detail below, PPS 106 utilizes the received target data to derive path plan data for achieving alignment with a target element, including steering system control signals $S_{SC}$ (yaw angle and heading commands), propulsion system control signals $S_{PC}$ (speed and acceleration commands), braking system control signals $S_{BC}$ (stop distance and brake force commands), and any other requisite motion commands. To provision automated vehicle driving and vehicle alignment, e.g., for living object protection (LOP) or vehicle submersion remediation, these control signals are fed, either directly or through a centralized ASCM 112, to a Vehicle Steering System Control Module (SSCM) 114, a vehicle Propulsion System Control Module (PSCM) 116, and Vehicle Brake System Control Module (BSCM) 118.

The motion commands output via PPS 106—controls signals $S_{SC}$, $S_{PC}$, $S_{BC}$—are aggregated via a summation selector module 110, along with motion feedback data as part of a closed-loop control scheme. With this closed-loop feedback, the intelligent vehicle system 100 is able to identify and quantify an alignment error, which is output as an alignment error signal SAE to ASCM 112. To offset this alignment error, the ASCM 112 may actively modulate the motion command signals, thus outputting modified steering system, propulsion system, and brake system control signals $S_{SC'}$, $S_{PC'}$, and $S_{BC'}$, respectively. The intelligent vehicle system 100 of FIG. 2 transmits the modified control signals $S_{SC'}$, $S_{PC'}$, and $S_{BC'}$ to a steering actuator of the vehicle's steering system via SSCM 114, to a propulsion actuator of the vehicle's propulsion system via PSCM 116, and a brake actuator of the vehicle's brake system via BSCM 118. While illustrated as discrete control modules and subsystems, it is envisioned that any of the schematically illustrated elements of FIG. 2 may be combined into a single module/controller/system or divided into any number of networked modules/controllers/systems.

Most commercially available vehicles do not come stock equipped with the necessary hardware and software to detect hazardous underbody conditions or foreign objects subjacent the vehicle chassis that may adversely affect the vehicle's passengers and/or underbody components. In addition, wireless power transfer (WPT) vehicle charging systems may produce magnetic fields along the vehicle undercarriage that exceed levels known to negatively impact animals, humans, and electronic devices, including implantable medical devices (IMD) and semiconductor printed circuit board assemblies (PCBAs). Over exposure to the magnetic fields generated by EMF coils may cause potentially adverse health effects to living objects or permanently damage exposed electronic devices. In wireless charging scenarios, existing radar-based LOP systems with sensing electronics in the charging pad have known issues with generating false-positives that needlessly suspend charging. Likewise, capacitive sensor-based LOP systems have known issues with outputting false-positive triggers due to parasitic couplings.

Disclosed systems, methods, and devices enable (living and non-living) foreign object detection and protection under the vehicle using resident vision-based systems, e.g., during driving, idling, parking, key-on and key-off, powertrain warming, wireless vehicle charging, etc. In the same vein, disclosed systems, methods, and devices utilize advanced vehicle camera systems and supervised AI learning methods to detect hazardous conditions (e.g., elevated water levels, ice formations, impeding roadway obstructions, large debris, pets, etc.) beneath the vehicle body and concurrently alert the vehicle operator while taking ameliorative measures, such as suspending vehicle motion, altering vehicle trajectory or speed, and/or suspending wireless vehicle charging. For example, underbody hazard detection and living object protection is accomplished using front, left, right, rear and (optionally) underbody cameras in conjunction with machine-learning based matching techniques with training data. For camera-based vehicle systems with an underbody (UB) camera, the UB camera may be protected by a hardened, transparent cover that may be kept clean using various methods, such as an integrated wiper system or an ultrasonic cleaning system. A vision processing system may be trained to assess the hazard level and concomitantly alert the vehicle operator of a potential hazard or foreign object.

Figure 4:
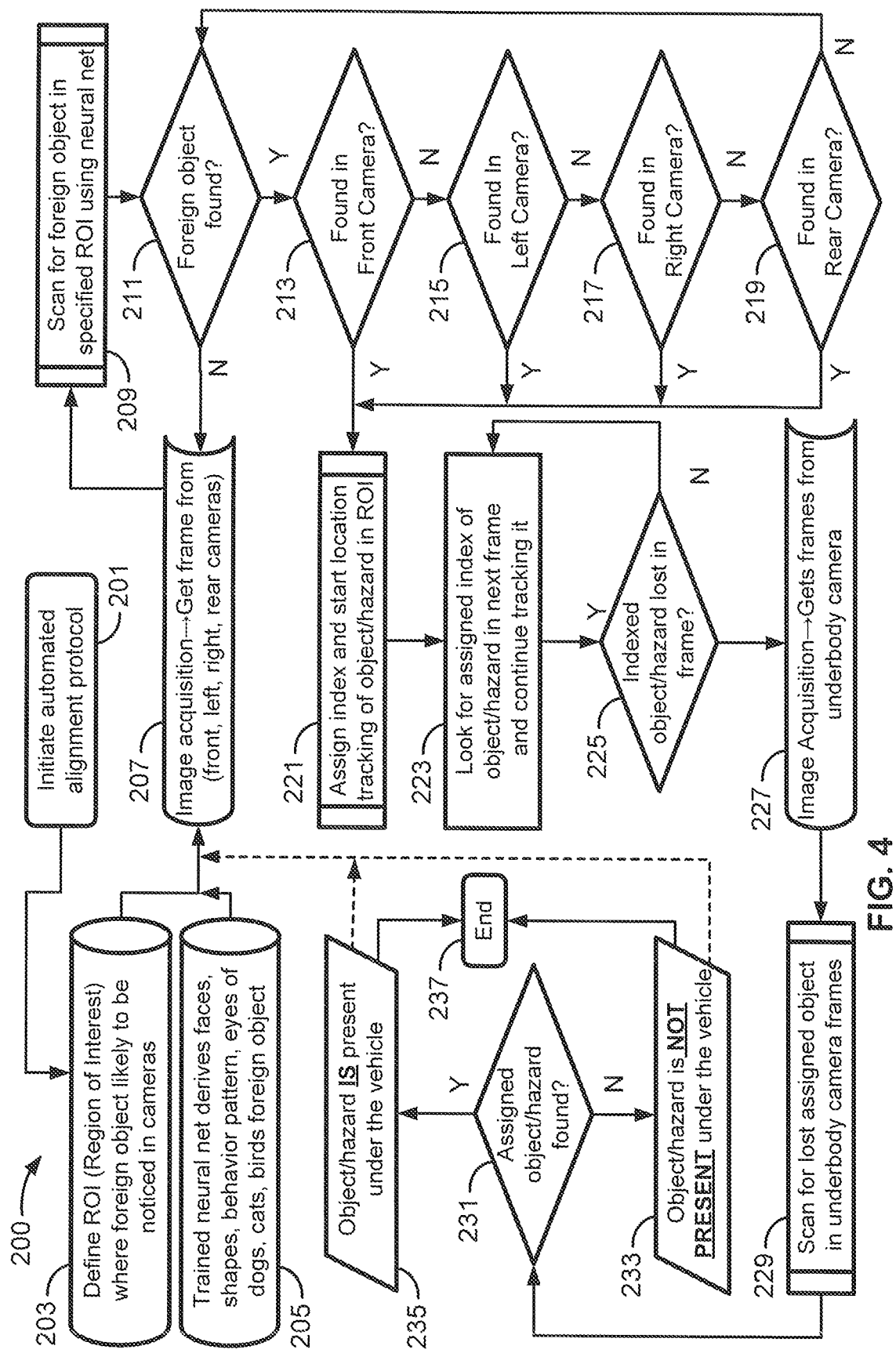
FIG. 4 is a flowchart illustrating an example vision-based vehicle alignment protocol with underbody foreign object detection and automated park assist for optimized wireless vehicle charging, which may correspond to memory-stored instructions executed by an onboard or remote controller, control-logic circuitry, programmable electronic control unit, or other integrated circuit (IC) device or network of IC devices in accord with aspects of the disclosed concepts.
Figure 5:
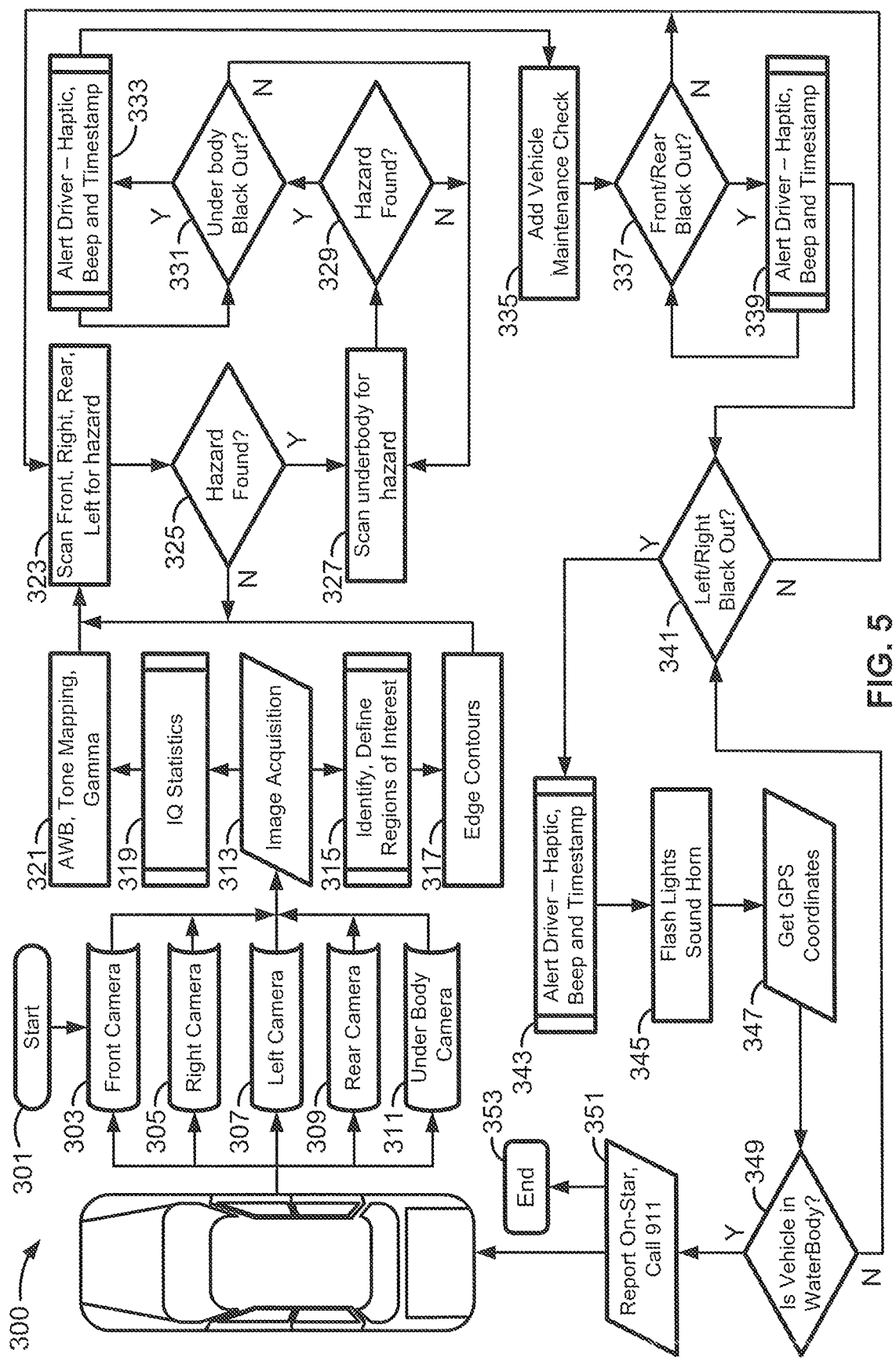
FIG. 5 is a flowchart illustrating an example vision-based advanced driver assistance protocol with underbody hazard detection for automated preventative vehicle driving and driver alert, which may correspond to memory-stored instructions executed by an onboard or remote controller, control-logic circuitry, programmable electronic control unit, or other integrated circuit (IC) device or network of IC devices in accord with aspects of the disclosed concepts.

With reference now to the flowchart of FIG. 4, an improved method or control strategy for automating vehicle alignment with underbody foreign object detection of a vehicle, such as electric-drive vehicle 10 of FIG. 1, using a camera-based control system, such as intelligent vehicle system 100 of FIG. 2, is generally described at 200 in accordance with aspects of the present disclosure. In the same vein, FIG. 5 presents at 300 an improved method for vision-based ADAS vehicle control with underbody hazard detection in accordance with aspects of the present disclosure. Some or all of the operations illustrated in FIGS. 4 and 5, and described in further detail below, may be representative of an algorithm that corresponds to processor-executable instructions stored, for example, in main or auxiliary or remote memory, and executed, for example, by an on-board or remote controller, processing unit, control logic circuit, or other module, device or network of devices, to perform any or all of the above and below described functions associated with the disclosed concepts. It should be recognized that the order of execution of the illustrated operations may be changed, additional operations may be added, and some of the operations described may be modified, combined, or eliminated.

Method 200 begins at terminal block 201 with processor-executable instructions for a programmable controller or control module or similarly suitable processor or server computer to call up an initialization procedure for an automated vehicle alignment protocol. This routine may be executed in real-time, continuously, systematically, sporadically and/or at regular intervals, for example, each 100 milliseconds, etc., during ongoing vehicle operation. As yet another option, terminal block 201 may initialize responsive to a user command prompt or a broadcast prompt signal received from a backend or middleware computing node tasked with autonomous vehicle alignment. As part of the initialization procedure at block 201, for example, resident vehicle telematics unit 42 may execute a navigation processing code segment, e.g., to obtain vehicle data (e.g., geospatial data, speed, heading, acceleration, timestamp, etc.), and optionally display select aspects of this data to an occupant of the vehicle 10. The occupant my employ any of the HMI input controls 48 to then select a desired origin and/or destination for the vehicle. It is also envisioned that the ECU 26 or telematics unit 42 processors receive vehicle origin and vehicle destination information from other sources, such as a server-class computer provisioning data exchanges for the cloud computing system 44 or a dedicated mobile software application operating on a smartphone or other handheld computing device.

Upon initialization, the method 200 provides processor-executable instructions at database block 203 to define an individual region of interest (ROI) for each of the resident vehicle cameras being utilized for underbody hazard/foreign object detection. An ROI may be categorized as a delineated camera frame area that is inset within each of the vehicle's camera-generated views, and has been predetermined to be a region in which foreign objects and hazard are likely to appear. By way of example, and not limitation, a first (fore) ROI 121 is inset within the forward vehicle view captured by the first (front) camera 120, a second (port-side) ROI 123 is inset within the leftward vehicle view captured by the second (left-hand) camera 122, a third (starboard-side) ROI 125 is inset within the rightward vehicle view captured by the third (right-hand) camera 124, and a fourth (undercarriage) ROI 127 is inset within the downward vehicle view captured by the underbody camera 126. These ROIs may be vehicle-calibrated features that are defined specific to a subject host vehicle. For instance, the ROIs may be based on a make/model/trim of the vehicle, the respective mounting locations of the cameras, the view area/angle of each camera, and/or a predefined protection region around the vehicle (e.g., a geofence that is 20 cm from all exterior surfaces). An ROI may be "defined" by retrieving the parameter from a lookup table stored in resident memory, by calculating the parameter during initial vehicle calibration procedures, by estimating the parameter through available model-based techniques, or through any other suitable determination procedures.

Prior to, contemporaneous with, or subsequent to the operations carried out at database block 203, the method 200 defines predetermined target markers for the foreign objects expected to enter the ROIs at database block 205. In accord with the illustrated example, a trained neural network will implement machine-learning based matching techniques with training data to derive one or more target markers for each foreign object. A predetermined target marker may include, for example, a respective shape, size, color, facial feature, eye type or other biometric feature, and behavioral pattern. To minimize in-vehicle hardware and processing capacity requirements, target marker generation may be performed offboard from the vehicle (e.g., via cloud computing system 44 of FIG. 1) and retrieved in real-time or during batch processing. For at least some preferred implementations, an ROI is obtained from a lookup table (LUT) of pixel locations for a subject camera.

Method 200 proceeds from database blocks 203 and 205 to data block 207 to acquire image data from one or more available on-body vehicle cameras. As described above, a host vehicle (e.g., automobile 10 of FIG. 1) may be originally equipped with or retrofit to include a front camera (e.g., first longitudinal camera 120 of FIG. 3) that mounts proximate a front end of the vehicle body, driver-side and/or passenger-side cameras (e.g., first and second side cameras 122, 124) that each mounts proximate a respective lateral side of the vehicle body, an optional underbody (UB) camera (e.g., second longitudinal camera 126) that mounts proximate an undercarriage of the vehicle body, and a rear camera (e.g., third longitudinal camera) that mounts proximate a rear end of the vehicle body. According to the illustrated example set forth in FIG. 3, the first longitudinal (front) camera 120 captures real-time, forward-facing views of the motor vehicle (e.g., an outboard field of view directed forward of the front bumper assembly), whereas the second (underbody) longitudinal camera 126 captures real-time, downward-facing vehicle views (e.g., an outboard field of view from the undercarriage directed towards the front drive axle), and the third longitudinal camera captures real-time, rearward-facing vehicle views (i.e., sequential camera frames). In the same vein, the first (left-hand) side camera 122 captures real-time, port side views of the motor vehicle (e.g., an outboard field of view oblique to a driver-side fender assembly), whereas the second (right-hand) side camera 124 captures real-time, starboard side views of the motor vehicle (e.g., an outboard field of view oblique to a passenger-side fender assembly). Each camera generates and outputs signals indicative of their respective view. These signals may be retrieved directly from the cameras or from a memory device tasked with receiving, sorting, and storing such data.

Advancing from data block 207 to subroutine block 209, the method 200 of FIG. 4 scans one or more still frames from the acquired image data for known target variants within the ROI of each of the corresponding vehicle views. For instance, a resident or remote vehicle controller may analyze the real-time images to detect upcoming hazards and living/inanimate foreign objects present in the forward-facing, side-facing, rear-facing, and/or downward-facing views of the motor vehicle. This analysis may include scanning each image for any of multiple targets each having a predetermined shape, size, color, outline and/or marker (collectively "target variants"). Suspected variants are isolated in and extracted from the scanned images, and a matching engine attempts to match an extracted variant with one of the predefined target variants. The target variants used for target element detection may be derived using machine learning concepts to identify individual target features corresponding to select target locations, objects, etc. The method 200 determines, at decision block 211, whether or not a hazard/target object has been detected. If not (Block 211=NO), the method 200 may advance from decision block 211 to terminal block 237 and terminate or, alternatively, may loop back to terminal block 201 or data block 207 and run in a continuous loop.

Responsive to detecting a hazard/target object within at least one of the ROIs in the perspective views of the vehicle (Block 211=YES), the method 200 of FIG. 4 continues to determination blocks 213, 215, 217 and 219 at which the detected target object is tracked by the available cameras. According to the illustrated example, camera sensor signals continue to be received from the front, side, and rear cameras; these sensor signals are indicative of real-time images of the vehicle's outboard-facing forward, left side, right side, and rear views. At block 213, the data images of the vehicle's front camera are scanned for the target, e.g., in a continuous or substantially continuous manner. Congruently, the data images of the vehicle's left-side camera are scanned for the target at block 215, and the data images of the vehicle's right-side camera are scanned for the target at block 217. At block 219, the data images of the vehicle's rear camera are scanned to see if the target object is found by a resident vehicle camera. If the hazard/target object is not found by any of the vehicle cameras (Block 213 and Block 215 and Block 217 and Block 219=NO), the method 200 may loop back to subroutine block 209.

With continuing reference to FIG. 4, method 200 responds to detection of the hazard/target object in any one of the vehicle cameras (Block 213 or Block 215 or Block 217 or Block 219=YES) by assigning an index identification (ID) and a start location to the hazard/foreign object, as indicated at subroutine block 221. During normal vehicle operation, a camera will likely capture multiple objects within its particular vehicle view; the vehicle controller will demarcate between extraneous objects (e.g., a distant tree, a mailbox, a roadway surface, etc.) and prospective target objects (e.g., a dog, a parking block, a large pothole, a black ice patch, etc.). A target object deemed to be a likely hazard or foreign object is labelled with a corresponding index ID and marked with coordinates for its start location within the vehicle view or views.

Method 200 thereafter advances to process block 223 to monitor the indexed hazard/foreign object in subsequent frames of the real-time images of the vehicle's outboard-facing end and side views by scanning for the index ID with respect to the start location. While looking for the assigned index and living object in successive camera frames, the vehicle controller determines whether or not that foreign object/hazard moves out of frame (i.e., disappears from vehicle view) in the side and end cameras, as indicated at decision block 225. If not (Block 225=NO), the method 200 cycles back to process block 223 or, alternatively, loops back to decision block 211 or ends at terminal block 237. On the other hand, in response to a determination that the indexed foreign object/hazard was lost in frame (Block 225=YES), the method 200 may assume the object/hazard has moved underneath the vehicle and, to corroborate, executes an image acquisition procedure at data block 227 to attain camera frame data of the vehicle's undercarriage view from the underbody camera. Movement of a hazard/object to the underbody of the vehicle may be a result of the object/hazard moving (e.g., transient living objects or roadway debris), the vehicle moving (e.g., during parking, highway driving, etc.), or a combination of both.

Upon acquisition of the underbody camera's captured image frames, subroutine block 229 of FIG. 4 scans these underbody camera frames to ascertain whether or not the target object/hazard is present or absent from an underbody region of the vehicle. For alternative intelligent vehicle system architectures that lack an underbody camera, the method 200 omits data block 227 and modifies subroutine block 229 to scan for a lost foreign object/hazard in other available camera frames. After scanning for the lost, index-assigned object/hazard in the underbody camera frames and/or other available camera frames, method 200 determines whether or not the lost object/hazard has been located by a resident vehicle camera at decision block 231. Upon determining that the object/hazard has not been located (Block 231=NO), the method 200 proceeds to input/output block 233 and transmits an alert to the driver that OBJECT/HAZARD NOT PRESENT and, optionally, transmits a commence charging signal to a charging system controller of a WEVSE at which the vehicle is attempting to recharge. Closed-loop feedback data resulting from the detected and lost hazard/object may be optionally accumulated and fed back to the control system for analysis and subsequent modulation of system parameters. The method 200 may then terminate at terminal block 237.

Upon determining that the object/hazard has been located and is present underneath the vehicle (Block 231=YES), the method 200 proceeds to input/output block 235 and transmits an alert to the driver that OBJECT/HAZARD PRESENT and, optionally, transmits a postpone charging signal to the charging system controller of the WEVSE. The driver may be prompted to take ameliorative action to remove the object/hazard from underneath the vehicle (e.g., sound horn and illuminate vehicle lights to scare off living object). In addition to, or as an alternative for, transmitting an alert to the driver, control signals are transmitted to the vehicle's propulsion, steering and/or braking systems to take preventative action that is calibrated to preclude collision of the vehicle with and/or remove the foreign object/hazard from the underbody region. Closed-loop feedback data resulting from detecting an underbody hazard/object may be optionally accumulated and fed back to the control system for analysis and subsequent modulation of system parameters. The method 200 may advance from input/output block 235 to terminal block 237 and terminate or, alternatively, may loop back to terminal block 201 and run in a continuous loop.

Turning next to FIG. 5, method 300 begins at terminal block 301 with processor-executable instructions for a programmable controller or control module or similarly suitable processor to call up an initialization procedure for an underbody hazard detection protocol with automated preventative vehicle driving and driver alert capabilities. As indicated above, the method 300 of FIG. 5 may include any of the features, options, and alternatives described above with respect to the method 200 of FIG. 4, and vice versa. In this regard, the features and options associated with terminal block 201 of FIG. 4 described above may be incorporated, singly or in any suitable combination, into terminal block 301 of FIG. 5. As yet another example, the image acquisition and aggregation operations carried out at data block 313, in conjunction with camera data blocks 303, 305, 307, 309 and 311 for retrieving camera sensor signals from front, right, left, rear and underbody cameras, respectively, may be similar in functionality to the operations carried out at data block 207. Likewise, identifying and defining regions of interest at subroutine block 315 may be similar or identical to the operations carried out at database block 203.

Prior to, contemporaneous with, or subsequent to image acquisition and ROI identification, method 300 of FIG. 5 determines the outer contours of sensitive underbody vehicle components (e.g., high-voltage (HV) propulsion motors, HV battery pack tray, power electronics modules, brake lines, suspension and roll control systems, etc.) at process block 317. Then, at IQ statistics subroutine block 319, the vehicle controller will determine a color temperature of the scene and an exposure value of the imager in the scene for each camera. In addition, at process block 321, the vehicle controller will determine Auto White Balancing (AWB) of the scene, Tone Mapping values for the scene, and Gamma curve values to help determine the presence and proximity of snow, water, and other hazards in the scene.

With continuing reference to FIG. 5, the method 300 advances to process block 323 to scan the camera frame data received from the front, right, left, and rear vehicle cameras for an oncoming hazard. It should be appreciated that the operations carried out at process block 323 of FIG. 5 may be similar or identical to those carried out at subroutine block 209 of FIG. 4. Comparable to decision block 211, the method 300 continues to decision block 325 to determine whether or not snow, water, ice or other potential hazard or foreign object is detected in any of the resident vehicle cameras. If not (Block 325=NO), the method 300 of FIG. 5 may advance from decision block 325 to terminal block 353 and terminate or, alternatively, may loop back to terminal block 301 or process block 323 and run in a continuous loop.

In response to a determination that a potential hazard or foreign object is detected in at least one of the resident vehicle cameras (Block 325=YES), the method 300 continues to process block 327 and scans the vehicle underbody for the hazard/object, e.g., similar to blocks 227 and 229 of FIG. 4. As another potential point of overlap, decision block 329 of FIG. 5 may be similar in function to decision block 231 of FIG. 4, during which the real-time images of the downward vehicle view captured by the underbody camera are evaluated to determine if the hazard/object is now located underneath the vehicle. If not (Block 329=NO), the method 300 may loop back to process block 327 or process block 323 or, alternatively, terminate at terminal block 353.

Responsive to a determination that the potential hazard/foreign object is located in an underbody region of the vehicle (Block 329=YES), the method 300 continues to decision block 331 to assess whether or not the underbody camera has blacked out and, thus, the vehicle is likely to be at least partially submerged or the vehicle undercarriage and/or underbody camera may have been severely damaged. If the underbody camera has not blacked out (Block 331=NO), the method 300 returns to process block 327 or terminates at terminal block 353. Conversely, upon determining that the underbody camera has blacked out (Block 331=YES), the method 300 responsively transmits an alert (e.g., visual, audible, and/or haptic warning) to a vehicle occupant indicative of the underbody hazard/foreign object at subroutine block 333. The occurrence of this event may be timestamped and stored in local cache memory. As yet a further option, the vehicle controller may set a maintenance check flag at process block 335, which may be accompanied by instructions to the vehicle driver to seek vehicle maintenance. As yet a further option, the vehicle controller may transmit one or more control signals to one or more vehicle dynamics systems to automate preventative measures designed to protect the vehicle.

Method 300 advances from process block 335 to decision block 337 to determine if the front or rear end cameras have also blacked, providing a further indication that the vehicle may be partially submerged (e.g., in a water hazard) or may have suffered damage (e.g., from a transient foreign object). If not (Block 337=NO), the method 300 may return to process block 323. If the front or rear cameras has blacked out (Block 337=YES), the method 300 proceeds to subroutine block 339 and responsively transmits a heightened alert to a vehicle occupant, a timestamped hazard event may be logged in local cache memory, a maintenance check flag may be set, and/or control signals may be transmitted to a combination of vehicle dynamics systems to automate preventative measures designed to protect the vehicle.

Method 300 thereafter advances from subroutine block 339 to decision block 341 to determine if the left or right-side cameras have also blacked, providing yet further indicia that the vehicle may be submerged or damaged. If not (Block 341=NO), the method 300 may return to process block 323. If any one of the front, rear, left or right cameras has blacked out (Block 341=YES), the method 300 proceeds to subroutine block 343 and responsively transmits a high alert to a vehicle occupant, a timestamped severe hazard event may be logged in local cache memory, a maintenance check flag may be set, and/or additional control signals may be transmitted to a combination of vehicle dynamics systems to automate preventative measures designed to protect the vehicle.

Process block 345 includes processor-executable instructions to flash one or more or all of the vehicle's exterior lamps and sound the vehicle horn system. At input/output block 347, geopositional coordinate data for the subject host vehicle is retrieved from a GPS service provider. Method 300 then determines, at decision block 349, if the vehicle is in a body of water (e.g., prompting the driver for feedback via telematics unit 42). If so (Block 349=YES), the method proceeds to input/output block 351 to transmit a report to a remote vehicle security and emergency system (e.g., OnStar®). The method 300 thereafter terminates at terminal block 353.

In addition to automating detection of underbody hazards and foreign objects and automating remediating measures to protect the vehicle and foreign objects, disclosed features may be employed in other applications, including the use of underbody camera to detect corrosive fluids in the vicinity of critical vehicle components, such as traction motors, in-vehicle electronics, exhaust system components, suspension components, steering components, brake components, etc. In addition, foreign objects, such as mud, stones, tree branches, etc., might impair proper functioning of the underbody components, such as steering and brake system components, and impede wireless vehicle charging; the vehicle may automate vehicle powertrain, steering and braking system operations to redress these issues. In addition, detection of the presence of poisonous and/or dangerous animals, such as venomous snakes, alligators, large spiders, scorpions, etc., prior to starting or entering/alighting from the vehicle may be avoided to protect vehicle users/occupants.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An advanced driver assistance (ADAS) system for a vehicle, the vehicle having a vehicle body with opposing front and rear ends, opposing left and right sides, a steering system, and a propulsion system, the ADAS system comprising:
   an end camera configured to mount proximate one of the ends of the vehicle body, capture an outboard-facing end view of the vehicle, and generate signals indicative thereof;
   a side camera configured to mount proximate one of the sides of the vehicle body, capture an outboard-facing side view of the vehicle, and generate signals indicative thereof; and
   a vehicle controller operatively connected to the end and side cameras, the vehicle controller being programmed to:
      receive, from the end and side cameras, camera signals indicative of real-time images of the outboard-facing end and side views of the vehicle, the end and side cameras each having a respective full-frame area;
      define a respective region of interest (ROI) inset within and fixed at a predefined location of each of the outboard-facing end and side views within which is expected a foreign object and/or a hazard, the ROIs each including a respective delineated camera frame having an ROI area smaller than the respective full-frame area of the corresponding camera;
      analyze the ROIs to detect if the foreign object and/or hazard is present in the outboard-facing end view and/or the outboard-facing side view of the vehicle;
      responsive to the vehicle controller detecting the foreign object and/or hazard in the outboard-facing end and/or side views of the vehicle, track movement of the foreign object and/or hazard to determine if the foreign object and/or hazard moves towards or away from an underbody region of the vehicle; and
      responsive to the vehicle controller determining the foreign object and/or hazard is moving towards or is in the underbody region of the vehicle, transmit an alert to the driver and/or control signals to the propulsion and/or steering systems to take preventative action calibrated to prevent collision of the vehicle with and/or remove from the underbody region the foreign object and/or hazard.

2. The ADAS system of claim 1, wherein the side camera includes left side and right side cameras, the left side camera configured to mount proximate the left side of the vehicle body and capture an outboard-facing leftward view of the vehicle, and the right side camera configured to mount proximate the right side of the vehicle body and capture an outboard-facing rightward view of the vehicle.

3. The ADAS system of claim 2, wherein the end camera includes front and back cameras, the front camera configured to mount proximate the front end of the vehicle body and capture an outboard-facing forward view of the vehicle, and the back camera configured to mount proximate the rear end of the vehicle body and capture an outboard-facing rearward view of the vehicle.

4. The ADAS system of claim 3, wherein tracking the movement of the foreign object and/or hazard via the vehicle controller is responsive to detecting the foreign object and/or hazard in any one of the ROIs of the leftward, rightward, forward, and rearward views.

5. The ADAS system of claim 1, wherein tracking the movement of the foreign object and/or hazard via the vehicle controller is responsive to detecting the foreign object and/or hazard in the ROI of the outboard-facing end view and/or the ROI of the outboard-facing side view.

6. The ADAS system of claim 1, further comprising an underbody camera configured to mount to the vehicle body proximate an undercarriage thereof, capture an outboard-facing downward view of the vehicle, and generate signals indicative thereof.

7. The ADAS system of claim 6, wherein the vehicle controller is further programmed to, responsive to detecting the foreign object and/or hazard in any of the ROIs of the end and side views of the vehicle, analyze the outboard-facing downward view of the underbody camera to determine if the foreign object and/or hazard is located in the underbody region of the vehicle.

8. The ADAS system of claim 7, wherein the vehicle controller is further programmed to, responsive to detecting the foreign object and/or hazard in any of the ROIs of the end and side views, determine if the foreign object and/or hazard has subsequently disappeared from the ROIs, wherein analyzing the outboard-facing downward view of the underbody camera is responsive to the foreign object and/or hazard disappearing from all of the ROIs.

9. The ADAS system of claim 1, wherein analyzing the ROIs via the vehicle controller to detect if the foreign object is present in the outboard-facing end view and/or the outboard-facing side view includes scanning the real-time images for any of a plurality of designated foreign objects each having a predetermined target marker, the predetermined target markers each including a shape, size, color, face, eyes, and/or behavioral pattern.

10. The ADAS system of claim 9, further comprising a memory device operatively connected to the vehicle controller and storing therein a lookup table with the predetermined target markers associated with the designated foreign objects, wherein the predetermined target markers are derived via a trained neural network, the vehicle controller being further programmed to retrieve, from the memory device prior to analyzing the ROIs, the predetermined target markers from the lookup table.

11. The ADAS system of claim 1, wherein defining the respective ROIs includes calibrating, specific to the vehicle, the ROIs based on a make/model of the vehicle, respective mounting locations of the end and side cameras, and/or a predefined protection region around the vehicle.

12. The ADAS system of claim 1, wherein the vehicle controller is further programmed to:
responsive to detecting the foreign object, assign an index identification (ID) and a start location to the foreign object; and
monitor the foreign object in subsequent frames of the real-time images of the outboard-facing end and side views of the vehicle by scanning for the index ID with respect to the start location.

13. The ADAS system of claim 12, further comprising an underbody camera configured to mount to the vehicle body proximate an undercarriage thereof and capture a downward-facing view of the vehicle, wherein the vehicle controller is further programmed to:
determine if the foreign object disappears from the subsequent frames in the real-time images of the outboard-facing end and side views; and
responsive to the foreign object disappearing from the subsequent frames, analyze real-time images captured by the underbody camera to detect if the foreign object is present in the downward-facing view of the vehicle.

14. A method for operating an advanced driver assistance (ADAS) system of a vehicle, the vehicle including a propulsion system and a steering system, the method comprising:
receiving, via a vehicle controller of the ADAS system from an end camera mounted proximate a front or rear end of a vehicle body of the vehicle, camera signals indicative of real-time images of an outboard-facing forward or rearward end view of the vehicle;
receiving, via the vehicle controller from a side camera mounted proximate a left or right lateral side the vehicle body, camera signals indicative of real-time images of an outboard-facing leftward or rightward side view of the vehicle, the end and side cameras each having a respective full-frame area;
determining a respective region of interest (ROI) inset within and fixed at a predefined location of each of the outboard-facing end and side views within which is expected a foreign object and/or a hazard, the ROIs each including a respective delineated camera frame having an ROI area smaller than the respective full-frame area of the corresponding camera;
analyzing the ROIs to detect if the foreign object and/or hazard is present in the outboard-facing end view and/or the outboard-facing side view of the vehicle;
responsive to detecting the foreign object and/or hazard, tracking movement of the foreign object and/or hazard to determine if the foreign object and/or hazard moves towards or away from an underbody region of the vehicle; and
transmitting an alert to the driver and/or control signals to the propulsion and/or steering systems to take preventative action calibrated to prevent collision of the vehicle with and/or remove from the underbody region the foreign object and/or hazard.

15. The method of claim 14, wherein the side camera includes left and right side cameras mounted proximate the left and right lateral sides the vehicle body, respectively, and the end camera includes front and back cameras mounted proximate the front and rear ends of the vehicle body, wherein tracking the movement of the foreign object and/or hazard is responsive to detecting the foreign object and/or hazard in any one of the ROIs inset within any one of the leftward, rightward, forward and rearward views.

16. The method of claim 15, wherein the ADAS system further includes an underbody camera mounted proximate an undercarriage of the vehicle body and configured to capture an outboard-facing downward view of the vehicle, the method further comprising analyzing, responsive to detecting the foreign object and/or hazard in any of the ROIs of the end and side views of the vehicle, the downward view of the underbody camera to determine if the foreign object and/or hazard is located in the underbody region of the vehicle.

17. The method of claim 16, further comprising determining, responsive to detecting the foreign object and/or hazard in any of the ROIs of the end and side views, if the foreign object and/or hazard has subsequently disappeared from the ROIs, wherein analyzing the outboard-facing downward view of the underbody camera is responsive to the foreign object and/or hazard disappearing from all of the ROIs.

18. The method of claim 14, wherein defining the respective ROIs includes calibrating, specific to the vehicle, the ROIs based on a make/model of the vehicle, respective mounting locations of the end and side cameras, and/or a predefined protection region around the vehicle.

19. The method of claim 14, further comprising:
assigning, responsive to detecting the foreign object, an index ID and a start location to the foreign object; and
monitoring the foreign object in subsequent frames in the real-time images of the outboard-facing end and side views of the vehicle by scanning for the index ID with respect to the start location.

* * * * *